United States Patent [19]
Fisher

[11] 3,956,603
[45] May 11, 1976

[54] SEAT BELT BUCKLE SWITCH HAVING WIRE BRIDGING CONTACT

[76] Inventor: Robert C. Fisher, 580 E. Long Lake Road, Bloomfield Hills, Mich. 48013

[22] Filed: Aug. 14, 1974

[21] Appl. No.: 497,224

Related U.S. Application Data

[63] Continuation of Ser. No. 385,332, Aug. 3, 1973, abandoned.

[52] U.S. Cl. .......................... 200/61.58 B; 24/230 A
[51] Int. Cl.[2] ...................... H01H 3/20; H01H 1/20; A44B 11/25
[58] Field of Search .............. 200/61.58 R, 61.58 B, 200/52 R, 243, 276, 61.76, 323, 324, 325; 307/10 SB; 180/82 C; 280/150 SB; 340/52 E; 24/230 A, 230 AL, 230 AK, 230 AV, 230 AT

[56] References Cited
UNITED STATES PATENTS

| | | |
|---|---|---|
| 2,510,115 | 6/1950 | Jakosky .................. 200/61.58 B X |
| 2,880,789 | 4/1959 | Leibinger .............. 200/61.58 B UX |
| 2,996,587 | 8/1961 | McCarthy ................... 200/61.58 B |
| 3,237,710 | 3/1966 | MacDonald ............. 200/61.58 B X |
| 3,269,483 | 8/1966 | Garner, Jr. ............... 200/61.58 B X |
| 3,297,841 | 1/1967 | Campbell .................... 200/61.58 B |
| 3,756,339 | 9/1973 | Cornelison, Jr. et al. 200/61.58 B X |
| 3,760,135 | 9/1973 | Nevett ........................ 200/61.58 B |
| 3,833,781 | 9/1974 | Rumpf ........................ 200/61.58 B |
| 3,874,694 | 4/1975 | Stephenson .............. 280/150 SB X |
| 3,890,003 | 6/1975 | Close ....................... 200/61.58 B X |

Primary Examiner—James R. Scott
Attorney, Agent, or Firm—Harness, Dickey & Pierce

[57] ABSTRACT

A passive restraint system for an automotive vehicle or the like includes a switch supported by a safety belt buckle. The switch is actuated in response to the placement of a tongue element connected to one end of a safety belt in a fixedly locked position relative to the buckle. In one form of the invention, the switch is "normally closed" and opened in response to interconnecting the belt and buckle members whereas in a second form a "normally open" switch is provided which is closed by interconnecting the members.

8 Claims, 10 Drawing Figures

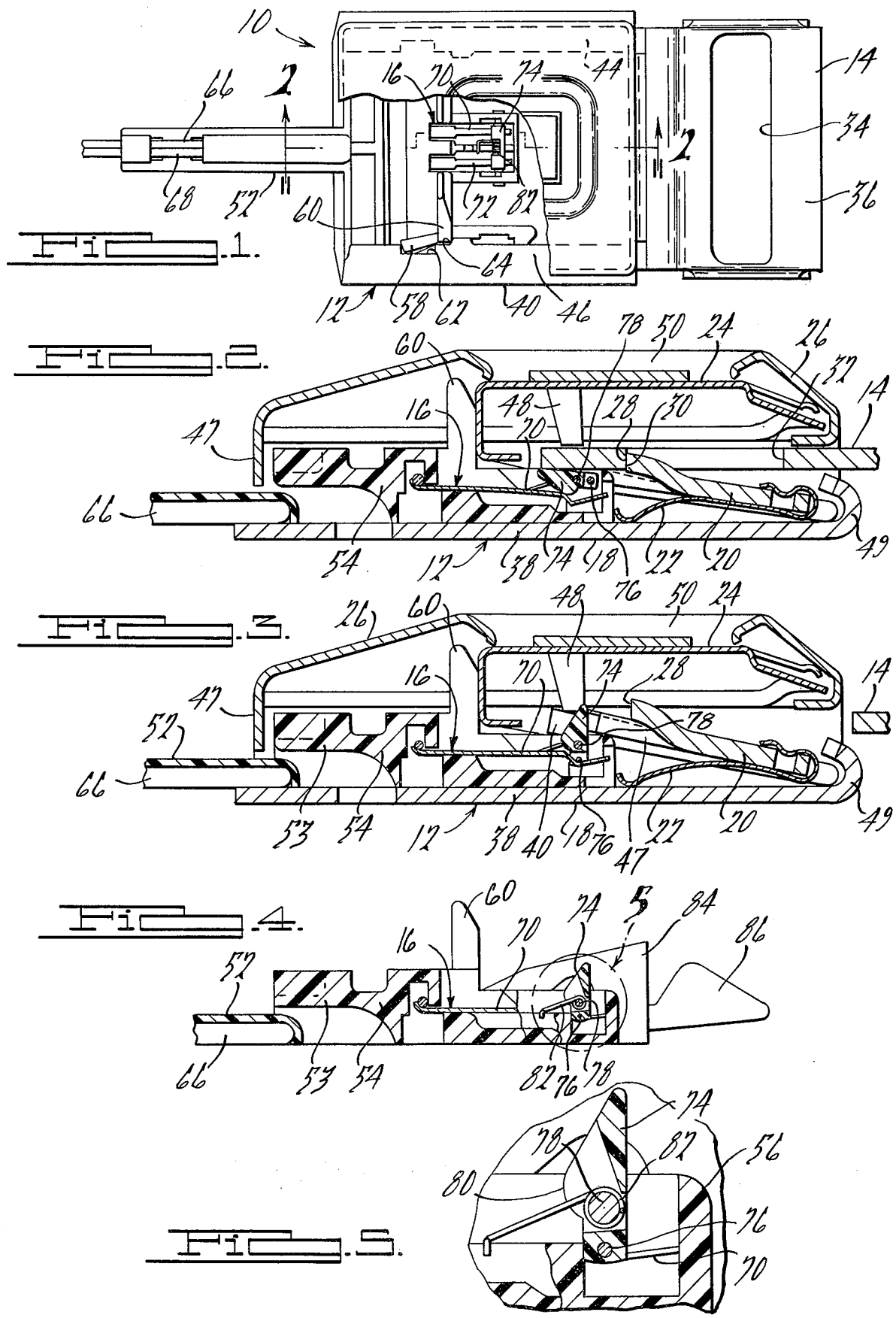

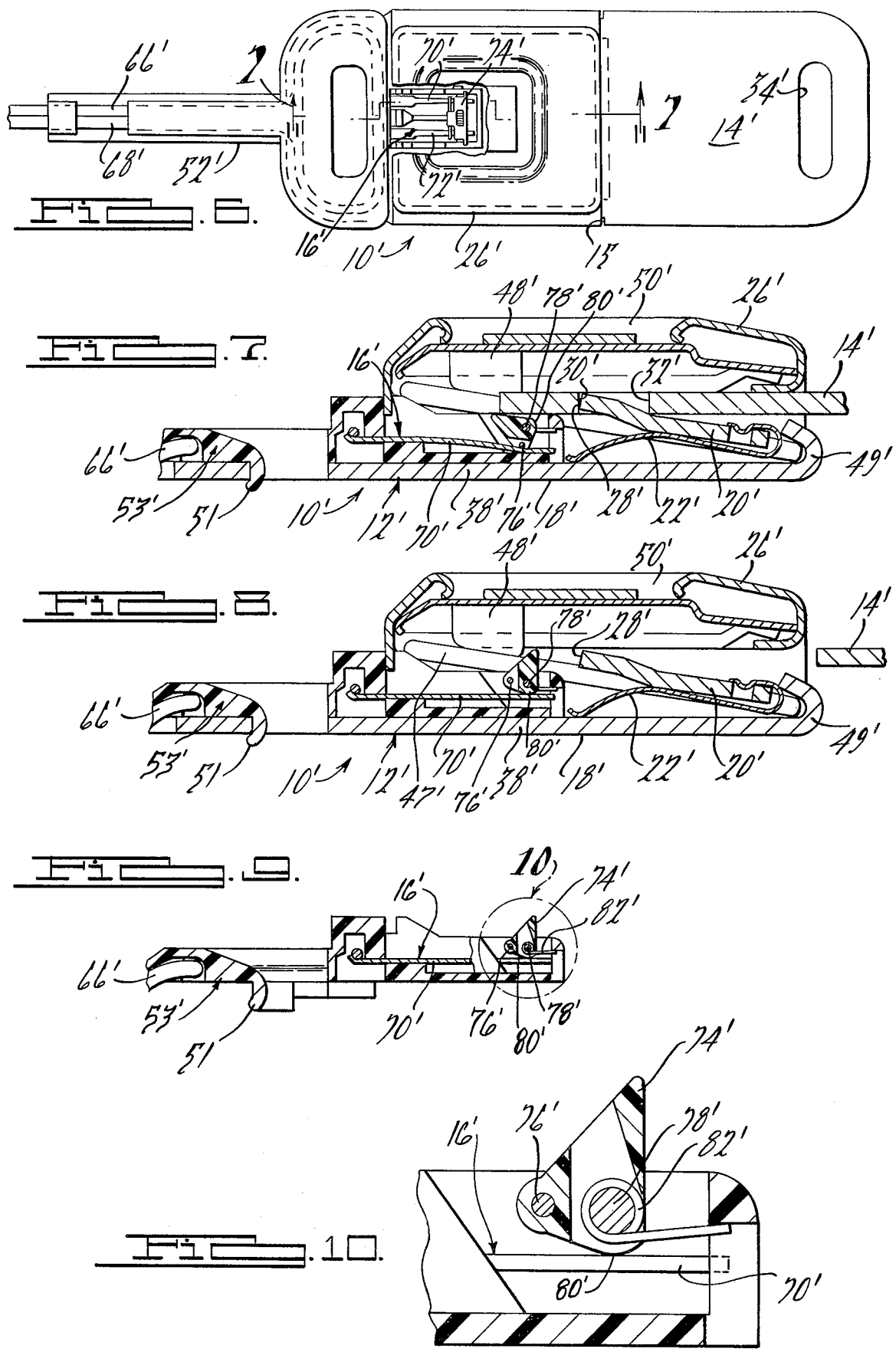

SEAT BELT BUCKLE SWITCH HAVING WIRE BRIDGING CONTACT

RELATED APPLICATION

This application is a continuation of application Ser. No. 385,332, filed Aug. 3, 1973, now abandoned.

BACKGROUND OF THE INVENTION

Reference may be had to U.S. Pat. Nos. 3,766,612, 3,237,710, 3,269,483, 3,694,595 and 3,331,108 uncovered by the Examiner in the prosecution of the original application to show various types of electric switches used in combination with release mechanisms including belt buckles.

SUMMARY OF THE INVENTION

The invention pertains to an improved electric switch within a safety belt buckle which is pivoted by the lockable tongue when inserted therein. To assure that various restraining systems are fully utilized during the operation of automotive vehicles and the like, it has been proposed to provide such vehicles with alarm or warning devices which are subject to be actuated in response to non-use of the restraining system. It has also been proposed to combine or interlock the restraining system with various operating components or assemblies of the vehicle, i.e., the ignition system whereby the vehicle is virtually inoperative in the absence of full or at least partial employment of the restraining system.

The present invention pertains to a new type of electrical switch for use in conjunction with the above indicated proposals and which is integrally combined with a buckle of a safety belt assembly. Some applications require a normally "closed" switch be provided which is opened in response to interconnecting the belt tongue and buckle, while in others a normally "opened" switch is closed by the interconnection. In one form of the present invention, the switch is "normally closed" while in a second form a "normally open" switch is provided.

The switch comprises an insulated finger which is pivotally mounted within the buckle in the path of advancement of the belt tongue therein. The forward end of the tongue tilts the finger during the latching of the tongue within the buckle. The pair of conductors from the buckle are attached to adjacent ends of a pair of contact members which are supported on an insulated element within the buckle with the opposite ends of the contact members extending in cantilever. A conducting bridging bar is carried by the finger for movement into and from engagement with the contact members when the finger is tilted. In one position of support of the bridging member on the finger, the bridging member is moved from engagement with the contact members when the finger is tilted to "open" the circuit. In another position of support of the bridging member on the finger, the bridging member is moved into engagement with the contact members when the finger is tilted to "close" the circuit across the pair of conductors. A spring is secured in engagement with the finger to return it to its initial untilted position into the path of movement of the end of the belt tongue as it is withdrawn from the buckle. Thus a switch is provided which is moved to "open" position when the belt tongue is inserted into and latched by the buckle or "closes" a circuit across the conductors when the belt tongue is advanced into the buckle into a latching position.

BRIEF DESCRIPTION OF THE DRAWINGS

FIG. 1 is a broken plan view of a safety belt buckle having an integral "normally closed" switch illustrating an embodiment of the present invention;

FIG. 2 is an enlarged sectional view of the structure illustrated in FIG. 1, taken on the lines 2—2 thereof with the switch in "open" position;

FIG. 3 is a view of the structure illustrated in FIG. 2 with the switch in "closed" position and the belt tongue removed;

FIG. 4 is a view in elevation of the "normally closed" switch assembly illustrated in FIG. 3;

FIG. 5 is a fragmentary enlarged view of the switch assembly enclosed within the circle 5 of FIG. 4;

FIG. 6 is a view of structure, similar to that illustrated in FIG. 1, having a belt buckle provided with a "normally open" switch covering a second form of the invention;

FIG. 7 is an enlarged sectional view of the belt structure illustrated in FIG. 6, taken on the lines 7—7 thereof;

FIG. 8 is a view of the structure illustrated in FIG. 7 with the switch in "closed position" and the belt tongue removed;

FIG. 9 is a view in elevation of the "normally open" switch assembly illustrated in FIG. 8, and FIG. 10 is a fragmentary enlarged view of the switch assembly enclosed within the circle 10 of FIG. 9.

DETAILED DESCRIPTION OF THE PREFERRED EMBODIMENTS

With reference now to FIGS. 1 to 5 of the drawings, a safety belt buckle in accordance with the preferred embodiment of the present invention is indicated generally at 10. The buckle 10 embodies a latching assembly 12 for receiving and securing a belt tongue 14 which operates an electric switch assembly 16 to open position. The precise details of the assembly 12 form no part of the subject invention and a complete disclosure can be found in U.S. Pat. No. 3,331,108, the patent being incorporated in this disclosure by reference. Generally speaking, however, the assembly 12 includes a base plate 18, a latch spring 22, a release button 24, and a cover plate 26. The foregoing components are adapted to be assembled in interlocking relationship on the base member 18 and are self-retained thereon. The belt tongue 14 has a forward aperture 32 providing a latch face 30 at the inner end which is engaged by a surface 28 on the end of a latch plate 20. A second aperture 34 is spaced to the right of the aperture 32 receiving one end of a safety belt (not shown), the latter being adapted to be adjustably looped around an end portion 36 of the belt tongue 14 and secured thereto by any suitable manner such as by stitching.

The base member 18 and the cover plate 26 form an outer housing which functions to self-retain and locatably support the internal components. The base member 18 is of generally channel-like shape having a web section 38 and parallel edge flanges 40 and 42 which are bent inwardly at 46 and 44 and disposed parallel to the web portion 38. One end of the web section 38 is provided with a reversely curved end section 49 that pivotably supports the end portion of the latch plate 20 for rotation and longitudinal movement relative to base member 18.

The latch plate 20 is normally biased towards latched position by a spring 22, and is releasable upon pushing inwardly on the release button 24. The button 24 is pivotably supported in a reversely bent section formed at the righthand end of the cover 26. The opposite end of the button is provided with spaced fingers 48 which engage the ends 40 of the extensions 47 at the sides of the surface 28 on the latch plate 20. In response to a downward pressure on the manual operated button 24 through an aperture 50 in the cover plate 26, the fingers 48 deflect the latch plate 20 and moves the surface 28 from the surface 30 to thereby release the tongue 14 and the belt.

The electric switch assembly 16 is supported on the center of the base member 18 and comprises generally a switch retainer 53 preferably fabricated from an insulating material such as thermo-plastic polyester. The lefthand end of the retainer 53 includes an elongated, conductor supporting section 52 adapted to locatably support a pair of conductors 66 and 68. The righthand end of the section 52 is integrally connected to a contact support section 54 having a lateral cross-section adapted to be slidably interfitting between the flanges 40 and 42 and beneath the inwardly bent portions 44 and 46. The section 52 is adapted to be located and further retained within the base member 18 by a flange section 60 abuting a shoulder 64 formed on the member 18 and by a pair of resilient tabs 58 slidably engaged within slots 62 formed on the bent portions 44 and 46. The lefthand end portions of the contact strips 70 and 72 are connected to the ends of the conductors 66 and 68 respectively and fixedly supported on the section 54 by suitable connector means (not shown), the righthand ends extend in cantilever to co-act with a suitable switch means as shall hereinafter be described.

The switch assembly 16 of FIGS. 1 to 5 "open" the circuit through the contact strips 70 and 72 in response to lockingly engaging the belt tongue 14 with the latch plate 20. A camming finger 74 of insulating material is pivotably connected to the righthand end of the retainer 53 by a suitable pivot pin 78. As best seen in FIGS. 4 and 5, a contact bar 76 is carried on the finger 74 below the pivot pin 78. The finger 74 has a camming nose 80 located in position to downwardly bias the righthand end of the contact strips 70 and 72 in response to counterclockwise rotation of the finger 74. The finger 74 is normally maintained in a relatively upright position by a suitable torsion spring 82 supported about the pivot pin 78 and including end portions which engage the retainer 53 and the pivoted finger 74 respectively. In the normally upright position, the contact bar 76 is conductively engaged across the contact strips 70 and 72 whereby to complete an electrical circuit across the conductors 66 and 68 and accordingly to function as a "normally closed" switch assembly when the belt tongue 14 is unattached.

Briefly, in operation, it will be seen that the finger 74 of the switch assembly 16 is normally maintained in an upright position, due to the bias of one end of the spring 82 with the pivoted finger 74. In this position, the contact bar 76 completes an electrical circuit across the contact strips 70 and 72. In response to the insertion of the belt tongue 14 into the assembly 12, the end portion thereof initially engages the upper surface of the latch plate 20 and deflects it downwardly against the bias of the latch spring 22. As the belt tongue 14 continues to travel to the left, the aperture 32 receives the latching end of the plate 20 to have the latch surface 30 move into position of engagement with the surface 28. Simultaneously, the lefthand end of the belt tongue 14 engages and pivots the finger 74 in a counter-clockwise direction about the pivot pin 78 moving the contact bar 76 out of engagement with the contact strips 70 and 72. As the bar 76 moves out of engagement with the contact strips 70 and 72, a nose or camming portion 80 on the finger 74 moves into engagement with the strips 70 and 72 retaining them in a substantially depressed position. When the belt is secured about a person the electrical circuit associated with the strips 70 and 72 is "open." Correspondingly, in response to depressing the button 24 the latch plate 20 is moved to release the belt tongue 14 from the latching assembly 12 and the finger 74 is returned to a normally upright position under the bias of the return spring 82, as illustrated in FIG. 5.

With reference to FIGS. 6 to 10, a normally "open" switch assembly is illustrated in accordance with another embodiment of the invention which is "closed" when the belt tongue 14 is in latched position within the assembly 12. For the purpose of clarity, identical assemblies, components, and elements are indicated by the same numerals employed in FIGS. 1 to 5 with the addition of a prime (') suffix.

As best seen in FIGS. 6, 7 and 8, a safety belt buckle is indicated generally at 10'. The buckle 10' comprises a latching assembly 12' for securing a belt tongue 14' which operates an electric switch assembly 16' to "closed" position when inserted into the assembly 12'. The assembly 12' comprises a base member 18', a latch spring 22', a release button 24', and a cover plate 26'. The tongue 14' is adapted to be releasably retained within the assembly 12' by a latch surface 28' which engages a latch surface 30' defined by the forward end of an aperture 32' in the belt tongue 14'. A second aperture 34' is spaced to the right of the aperture 32' and is adapted to cooperatively receive one end of a safety belt (not shown). The belt tongue 14' further includes a shoulder portion 15 at each side which functions as a stop to restrict the movement between the tongue 14' and the base member 18'.

The base member 18' and the cover plate 26' form an outer housing which functions to retain and support the internal components. The latch plate 20' is normally biased towards the latched position by the spring 22', and releasable through manipulation of the release button 24'. One end of the butt on 24' is pivotably supported in a reversely bent section at the righthand end of the cover 26' with the opposite end having a pair of downwardly extending fingers 48' which deflect the latch plate 20' in response to pressure applied to the button 24'. The pressure is applied to the button 24' through an aperture 50' formed in the cover plate 26', which will pivot about the fulcrum at the end of the cover plate 26' and move the fingers 48' against the side web surfaces 47' of the latch plate 20' which is deflected downwardly about a second fulcrum defined by the reversely bent end 49' of the base member 18'.

The assembly 16' comprises a switch retainer 53' preferably fabricated from an insulating material such as, thermoplastic polyester. The retainer 53' includes an extending section 52' which supports a pair of conductors 66' and 68' and which extends from a contact support section 54' having a lateral cross-section which interfits between the uprightly extending flanges 40' and 42' and beneath the bent in portion 44' and 46' formed on the side edges of the base member 18'. The lefthand end portions of contact strips 70' and 72' are connected to the ends of the conductors 66' and 68' respectively and are fixedly supported on the section 54' by suitable connecting means (not shown) with the righthand ends supported in cantilever to co-act with suitable switch means as shall hereinafter be described.

In the switch assembly 16' of the present invention, a circuit is "closed" across the contact strips 70' and 72' in response to lockingly engaging the belt tongue 14' in fixed relationship relative to the latching assembly 12'. A camming finger 74' of insulating material is pivotably connected to the righthand end of the retainer 53' by a pivot pin 78'. As best seen in FIGS. 4 and 5, a contact bar 76' is spaced relative to the pin 78' in fixed relation on the finger 74'. The finger 74' includes a downwardly extending camming nose portion 80' which is in position to downwardly bias the righthand end of the contact strips 70' and 72'. The finger 74' is normally maintained in a relatively upright position by a suitable torsion spring 82' supported about the pivot pin 78' including end portions connected between the retainer 53' and the pivotable finger 74', respectively. When the finger 74' is in normally upright position, the contact bar 76' is spaced relative to the contact strips 70' and 72' providing an "open" electrical circuit across the conductors 66' and 68' and accordingly functions as a "normally open" switch assembly when the belt is in released position.

It will be seen that the finger 74' of the switch assembly 16' is normally maintained in an upright position by the bias of the spring 82' which maintains the contact bar 76' in spaced relationship relative to the contact strips 70' and 72'. In response to the insertion of the belt tongue 14' in the latching assembly 12', the end thereof initially engages the upper surface of the latch plate 20' which is deflected against the bias of the latch spring 22'. As the belt tongue 14' continues to travel to the left, the aperture 32' receives the latch having the latching surface 28' at the end which lockingly engages the latch surface 30' on the belt tongue. The advancing lefthand end of the belt tongue 14' abuts the finger 74 and pivots it in a counter-clockwise direction about the pivot pin 78'. As the finger 74' is pivoted, the contact bar 76' rotates into engagement with the contact strips 70' and 72' to complete a circuit. As the contact bar 76' rotates into engagement with the strips 70' and 72', a nose or camming portion 80' on the finger 74' rotates out of engagement therewith before being engaged by the contact bar 76' which completes a circuit across the strips 70' and 72' to provide a "closed" circuit. Correspondingly, in response to depressing the button 24' the belt tongue 14' is released and moved to the right to permit the finger 74' to return to a normally upright position under the bias of the spring 82' to " open" the circuit. It will be noted that a safety belt buckle including an electrical switch has been provided for applications requiring the employment of a "normally closed" electrical switch when the belt is in latched position.

I claim:

1. In a restraining system, fabric belt means having ends to be secured together about an occupant of a vehicle, a buckle on one end of said belt means having a top and bottom element and an open end opposite to the end to which the belt end is attached, a tongue on the end of the other belt means insertable through said open end, releasable latching means within said buckle securing said tongue therein, a molded insulating element within said buckle, spaced conducting means supported by said insulating element, a deflectable finger extending upwardly from said insulating element in the path of movement of said tongue, a conducting bridging element on said finger out of engagement with said conducting means when the restraining system is not in use, whereby the insertion of said tongue within the buckle into latched position causes said finger to be deflected and the bridging element to complete a circuit through said conducting means when the belt is in occupant engaged position.

2. In a restraining system as recited in claim 1, wherein cam means is provided on said finger for engagement with said conducting means for maintaining the circuit open when the tongue is inserted into latched position within the buckle.

3. In a restraining system as recited in claim 2, wherein cam means is provided on said finger for engagement with said conducting means for closing the circuit therethrough when the tongue is removed from latched position within the buckle.

4. In a passenger restraint system for a vehicle comprising a belt having ends adapted to be secured together about the occupant of a vehicle, a buckle on one end of said belt having an open end, a tongue on the other end of the belt insertable through the open end of said buckle, and releasable latching means within said buckle for securing said tongue therein, the improvement comprising an insulating element within said buckle, a pair of electrical contacts supported by said insulating element in electrically spaced relation to one another and to said buckle and tongue, electrical conductive means engageable with said contacts and having a movable portion for making and breaking an electrical circuit between said contacts, and insulating means within said buckle movable by said tongue upon insertion thereof into said buckle for moving the movable portion of said conductive means relative to said contacts for controlling a circuit through said contacts.

5. A restraint system as recited in claim 4, wherein said movable insulating means comprises a finger pivoted on said insulating element and having a portion disposed in the path of advancement of said tongue, said conductive means comprising a bridging element having a portion movable by said pivoted finger between the electrically engaged and disengaged condition with said contacts for making and interrupting an electrical circuit therebetween, respectively.

6. A restraint system as recited in claim 3, wherein spring means are provided for biasing said finger from a deflected position to an erect position into the path of movement of said tongue.

7. A restraint system as recited in claim 4, wherein said contacts are movable and said pivoted finger has a camming surface which moves into engagement with said contacts to bias them to a position of disengagement with said conductive means when the tongue is removed from said buckle.

8. A restraint system as recited in claim 4, wherein said contacts are movable and said pivoted finger has a camming surface which moves out of engagement with said contacts to permit them to move to a position to be engaged by said conductive means when the tongue is removed from said buckle.

* * * * *